United States Patent

Hayashida et al.

[11] Patent Number: 6,156,236
[45] Date of Patent: Dec. 5, 2000

[54] CONDUCTIVE ORGANOPOLYSILOXANE COMPOSITION

[75] Inventors: Osamu Hayashida; Takeo Yoshida, both of Annaka; Toshihide Shimizu, Urayasu; Tamaki Iida, Kiyose, all of Japan

[73] Assignee: Shin-Etsu Chemical Co., Ltd., Tokyo, Japan

[21] Appl. No.: 09/272,341

[22] Filed: Mar. 19, 1999

[30] Foreign Application Priority Data

Mar. 20, 1998 [JP] Japan ................................. 10-092580

[51] Int. Cl.$^7$ ................................ H01B 1/04; C08K 5/34; C08K 3/08; C07P 221/18; C07P 471/22

[52] U.S. Cl. .......................... 252/512; 252/513; 252/514; 252/518.1; 252/521.3; 524/86; 524/87; 524/89; 524/90; 524/91; 524/403; 524/413; 524/439; 524/440; 524/588; 544/115; 544/117; 544/338; 544/342; 546/26; 546/47; 546/48; 546/59; 546/60

[58] Field of Search ..................... 252/512, 513, 252/514, 518.1, 521.3; 524/86, 87, 89, 90, 91, 99, 100, 102, 403, 413, 439, 440, 588; 544/1, 99, 63, 115, 117, 120, 224, 336, 338, 342; 546/26, 47, 48, 59, 60

[56] References Cited

U.S. PATENT DOCUMENTS

| 4,145,317 | 3/1979 | Sado et al. | 252/512 |
|---|---|---|---|
| 4,759,874 | 7/1988 | Gros | 252/512 |
| 5,075,038 | 12/1991 | Cole et al. | 252/514 |
| 5,700,398 | 12/1997 | Angelopoulos et al. | 252/500 |
| 5,708,123 | 1/1998 | Johannsen et al. | 528/229 |
| 6,015,509 | 1/2000 | Angelopoulos et al. | 252/500 |

FOREIGN PATENT DOCUMENTS

| 0 653 463 | 5/1995 | European Pat. Off. . |
|---|---|---|
| 57-8249 | 1/1982 | Japan . |

*Primary Examiner*—Robert Dawson
*Assistant Examiner*—Jeffrey B. Robertson
*Attorney, Agent, or Firm*—Oblon, Spivak, McClelland, Maier & Neustadt, P.C.

[57] ABSTRACT

A conductive organopolysiloxane composition is provided which includes (A) 100 parts by weight of an organopolysiloxane; and (B) 0.1 to 800 parts by weight of a conductive material obtained by subjecting a member selected from the group consisting of a conductive metal, a conductive metal compound, a filler surface-treated with a conductive metal and a filler surface-treated with a conductive metal compound, to surface treatment with a compound selected from the group consisting of a compound represented by the formula (1) and a compound represented by the formula (2).

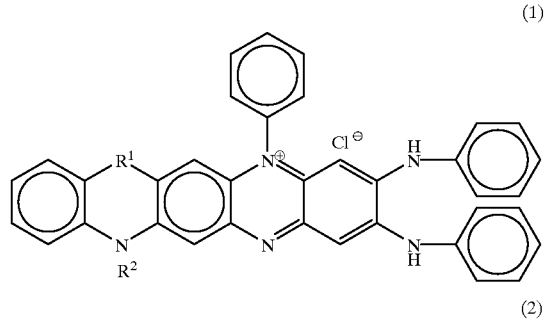

(1)

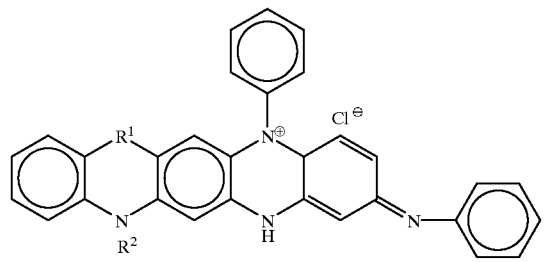

(2)

wherein $R^1$ represents —O— or —NH—, and $R^2$ represents a hydrogen atom or a phenyl group. This composition is useful for the formation of a silicone rubber having a sufficient electrical conductivity and also stably retainable of electrical conductivity almost without undergoing a change in electrical conductivity even in a high-temperature environment.

9 Claims, No Drawings

CONDUCTIVE ORGANOPOLYSILOXANE COMPOSITION

BACKGROUND OF THE INVENTION

1. Field of the Invention

This invention relates to a conductive organopolysiloxane composition that can provide upon curing a conductive silicone rubber exhibiting a resistivity stable in conducting regions.

2. Description of the Prior Art

Silicone rubber compositions provide, upon curing, silicone rubbers having superior weatherability, heat resistance, freeze resistance, electrical insulation properties and so forth. Hence, making the most of such properties, they are used in various industrial fields. Various additives are also added to such compositions so that, after being cured, they can be used as conductive silicone rubbers. In such an instance, conductive carbon black is widely used as a conductive material. Since, however, carbon black blackens the compositions, it can not be used when products are not desired to be blackened.

In instances where an electrical conductivity of $1 \times 10^{-2}$ $\Omega \cdot cm$ or below as volume resistivity is required, the conductive carbon black must be added in so large a quantity as to cause color migration to other portions.

In order to cope with such instances where products are not desired to be blackened or a low electrical resistance is required, studies are made on conductive materials other than carbon black. For example, studied are conductive metal powders such as gold powder, silver powder and nickel powder, and fillers such as glass beads which have been surface-treated with conductive metals to obtain fillers coated with conductive metals.

However, silicone rubbers compounded with conductive metal powders or glass beads coated with conductive metals still have an insufficient electrical conductivity and also have a disadvantage that they may undergo a change in electrical conductivity with time especially in a high-temperature environment of 100° C. or above.

EP 653463 A discloses an electrically conductive silicone rubber composition containing a silver powder having low ammonium ion and sulphate ion concentrations and having reduced change in curability during ageing.

Japanese Patent Publication (kokai) 57-8249 discloses a composition, which is curable to give a rubbery elastomer, comprising a polyorganopolysiloxane, a polyorganohydrogenpolysiloxane, a transition metal powder and a catalyst.

SUMMARY OF THE INVENTION

The present invention was made in order to solve the above problem. Accordingly, an object of the present invention is to provide a conductive organopolysiloxane composition that can form a silicone rubber having a sufficient electrical conductivity and also stably retainable of electrical conductivity almost without undergoing a change even in a high-temperature environment of 100° C. or above.

To achieve the above object, the present invention provides a conductive organopolysiloxane composition comprising;

(A) 100 parts by weight of an organopolysiloxane; and
(B) a conductive material obtained by subjecting a member selected from the group consisting of a conductive metal, a conductive metal compound, a filler surface-treated with a conductive metal and a filler surface-treated with a conductive metal compound, to surface treatment with a compound selected from the group consisting of a compound represented by the following general formula (1) and a compound represented by the following general formula (2).

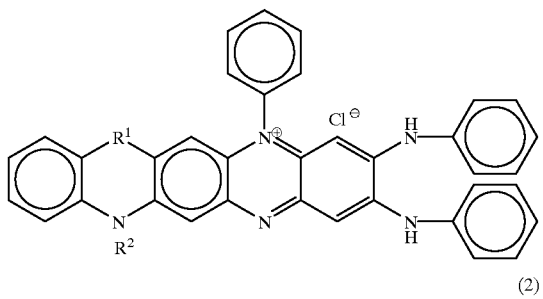

(1)

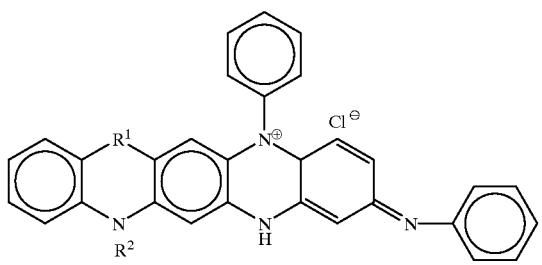

(2)

(In the formulas, $R^1$ represents —O— or —NH—, and $R^2$ represents a hydrogen atom or a phenyl group.)

DESCRIPTION OF THE PREFERRED EMBODIMENTS (A) Organopolysiloxane:

The composition of the present invention has an organopolysiloxane as component (A). The component-(A) organopolysiloxane is a base polymer of the conductive organopolysiloxane composition of the present invention. There are no particular limitations on this organopolysiloxane, including organopolysiloxane gums, silicone oils and silicone resins. In order to provide silicone rubber (a cured product), preferred is an organopolysiloxane represented by an average compositional formula (I): $R_n SiO_{(4-n)/2}$ (wherein R is a substituted or unsubstituted monovalent hydrocarbon group, and n is a positive number of 1.95 to 2.04).

In the average compositional formula (I), R's may be the same or different and may preferably include substituted or unsubstituted monovalent hydrocarbon groups having preferably 1 to 12, more preferably 1 to 8 carbon atoms. Examples of such monovalent hydrocarbon groups are alkyl groups such as a methyl group, an ethyl group, a propyl group, a butyl group, a hexyl group and a dodecyl group; cycloalkyl groups such as a cyclohexyl group; alkenyl groups such as a vinyl group, an allyl group, a butenyl group and a hexenyl group; aryl groups such as a phenyl group and a tolyl group; aralkyl groups such as a β-phenylpropyl group; and any of these at least part of hydrogen atoms bonded to the carbon atom(s) of which is substituted with a halogen atom or a cyano group, such as a chloromethyl group, a trifluoropropyl group or a cyanoethyl group. A methyl group, a phenyl group, a vinyl group and a trifluoropropyl group are preferred. Letter symbol n represents a positive number of 1.95 to 2.04.

This organopolysiloxane is one terminated with trimethylsilyl groups, dimethylvinylsilyl groups, dimethylhydroxysilyl groups or trivinylsilyl groups on its molecular chain. When this organopolysiloxane is used as a base polymer of an addition-curable organopolysiloxane composition, it is required to have at least two alkenyl groups in the molecule. There is no such limitation when it is used as a base polymer of a peroxide-curable organopolysiloxane composition, and may preferably be one in which R is held by an alkenyl group, in particular, a vinyl group, by 0.001 to 5 mol %, in particular, 0.01 to 0.5 mol %.

The component-(A) organopolysiloxane can be obtained usually by co-hydrolysis-condensation of one or more of organohalogenosilanes selected, or by ring-opening polymerization of a cyclic polysiloxane (e.g., trimers or tetramers of siloxanes) in the presence of an alkaline or acid catalyst. This is basically a straight-chain diorganopolysiloxane, but may be branched partly. It may also be a mixture of two or more organopolysiloxanes having different molecular structures. Also, this organopolysiloxane may preferably be those having a viscosity of 100 cSt or above at 25° C., and more preferably from 100,000 to 10,000,000 cSt. It may preferably have a degree of polymerization of 100 or above, and particularly preferably 3,000 or above. Its upper limit may preferably be 100,000, and more preferably from 3,000 to 10,000.

(B) Conductive material:

The composition of the present invention has a conductive material as component (B). The component-(B) is constituted of a conductive metal, a conductive metal compound or a surface-treated filler.

The conductive metal may include conductive metal powders such as gold powder, silver powder, copper powder and nickel powder, as well as mixtures or alloy powders of any of these. The conductive metal compound may be exemplified by tin oxide, zinc oxide, conductive titanium oxide and conductive barium sulfate. The surface-treated filler may include fillers such as glass beads, talc, graphite and carbon black whose particle surfaces have been treated with the above conductive metal or conductive metal compound. Such surface treatment of the filler may be made by any conventional methods, e.g., by reducing an oxidized metal and depositing the metal on filler particles, or by adding to a suspension of filler particles a compound solution containing a conductive metal, followed by hydrolysis and heat treatment. In such an instance, the conductive metal or conductive metal compound may be used in an amount of from 1 to 30 parts by weight, and preferably from 3 to 20 parts by weight, based on 100 parts by weight of the filler.

The component-(B) conductive material used in the present invention is obtained by subjecting at least one member selected from the group consisting of the conductive metal, the conductive metal compound, the filler surface-treated with the conductive metal and the filler surface-treated with the conductive metal compound, to surface treatment with at least one compound of the compounds represented by the general formulas (1) and (2) set out previously. This surface treatment is made by immersing the conductive metal powder, conductive metal compound powder and/or surface-treated filler particles in a solution prepared by dissolving in an organic solvent such as methanol or hexane at least one compound of the compounds represented by the general formulas (1) and (2), followed by filtration and then drying. Here, at least one compound of the compounds represented by the general formulas (1) and (2) may preferably be used in an amount of from 10 to 100,000 ppm, and particularly preferably from 100 to 10,000 ppm, (by weight) based on the weight of the conductive metal, conductive metal compound and/or surface-treated filler. Its use in an amount less than 10 ppm may make the present invention not effective. Its use in an amount more than 100,000 ppm may cause mutual agglomeration of the conductive metal powder particles to damage electrical conductivity.

As specific examples of the compounds represented by the general formulas (1) and (2), they may include the following.

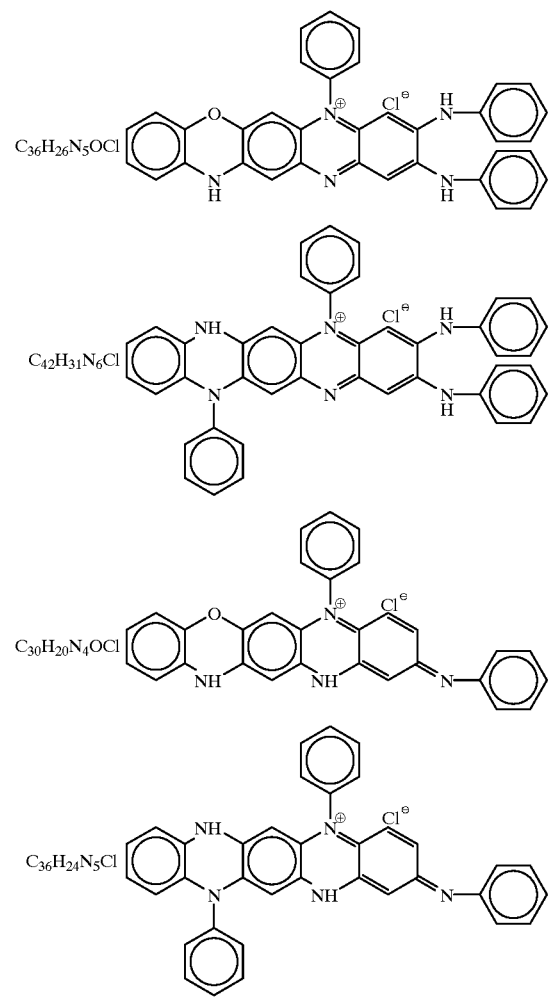

The component-(B) conductive material may usually be added in an amount of from 0.1 to 800 parts by weight, preferably from 5 to 600 parts by weight, and more preferably from 100 to 500 parts by weight, based on 100 parts by weight of the component-(A) organopolysiloxane. Its addition in an amount less than 0.1 part by weight may provide no sufficient electrical conductivity. Its addition in an amount more than 800 parts by weight may damage workability of the resultant silicone rubber.

Other components:

The composition of the present invention can be formed into silicone rubbers by curing it with addition of a curing agent. As the curing agent, any known organohydrogenpolysiloxane/platinum catalysts (curing agents for addition reaction) or organic peroxide catalysts may be used.

The organohydrogenpolysiloxane is used when the composition of the present invention is prepared as an addition-curable organopolysiloxane composition and the component-(A) is an organopolysiloxane having in its molecule two or more alkenyl groups bonded to silicon atoms. This organohydrogenpolysiloxane may be any of straight chain, branched chain and cyclic ones, but may preferably be those having a degree of polymerization of 300 or below.

Such an organohydrogenpolysiloxane is represented by an average compositional formula (II): $R^1{}_aH_bSiO_{(4-a-b)/2}$ (wherein $R^1$ represents the same group as the R in the formula (I), and a and b are positive numbers satisfying $0 \leq a<3$, $0<b<3$ and $0<a+b<3$. As examples thereof, it may include diorganopolysiloxanes terminated with dimethylhydrogensilyl groups, copolymers of a dimethylsiloxane unit, a methylhydrogensiloxane unit and a terminal trimethylsiloxyl unit, low-viscosity fluids comprised of a dimethylhydrogenpolysiloxane unit [$H(CH_3)_2SiO_{0.5}$ unit] and an $SiO_2$ unit, 1,3,5,7-tetrahydrogen-1,3,5,7-tetramethylcyclotetrasiloxane, 1-propyl-3,5,7-trihydrogen-1,3,5,7-tetramethylcyclotetrasiloxane, and 1,5-dihydrogen-3,7-dihexyl-1,3,5,7-tetramethylcyclotetrasiloxane.

This organopolysiloxane as a curing agent may preferably be added in such an amount that hydrogen atoms bonded to silicon atoms may be in an amount of from 50 to 500 molt based on the molar weight of aliphatic unsaturated groups (alkenyl groups) of the component-(A) organopolysiloxane.

The platinum catalyst used in combination with the organohydrogenpolysiloxane may be any of those conventionally known. Stated specifically, it may be exemplified by platinum element alone; platinum compounds such as platinic chloride; chloroplatinic acid; and complexes of chloroplatinic acid with an alcohol compound (e.g., 2-ethylhexanol), an aldehyde compound, an ether compound or an olefin (e.g., tetravinlyltetramethylcyclotetrasiloxane). The platinum catalyst may be added in an amount ranging from 1 to 2,000 ppm in terms of platinum atom based on the weight of the component-(A) organopolysiloxane.

Meanwhile, when the organic peroxide catalyst is used as the curing agent, there are no limitations on the above matter with respect to the component-(A) organopolysiloxane. In the organopolysiloxane used as the component (A), the R in the formula (I) may preferably be held by an alkenyl group, in particular, a vinyl group, by 0.001 to 5 molt, in particular, 0.01 to 0.5 mol %. The organic peroxide catalyst may include, e.g., benzoyl peroxide, 2,4-dichlorobenzoyl peroxide, p-methylbenzoyl peroxide, 2,4-dicumyl peroxide, 2,5-dimethyl-bis(2,5-t-butylperoxy)hexane, di-t-butyl peroxide and t-butyl perbenzoate. The organic peroxide catalyst may usually be added in an amount of from 0.1 to 5 parts by weight based on 100 parts by weight of the component-(A) organopolysiloxane.

Fine silica powder may preferably be added to the composition of the present invention.

The fine silica powder is a component necessary for obtaining a silicone rubber having a good mechanical strength. For this purpose, a fine silica powder having a specific surface area of 50 $m^2/g$ or more, and preferably from 100 to 400 $m^2/g$, may be used. This fine silica powder may be exemplified by fumed silica (dry-process silica) and precipitated silica (wet-process silica). In particular, fumed silica is preferred. Its particle surfaces may also be treated with an organopolysiloxane, an organopolysilazane, chlorosilane or an alkoxysilane to make hydrophobic. Such silica may be used alone or in combination of two or more. This fine silica powder may be added in an amount of from 5 to 100 parts by weight, preferably from 10 to 90 parts by weight, and particularly preferably from 30 to 80 parts by weight, based on 100 parts by weight of the component-(A) organopolysiloxane. Its addition in an amount less than 5 parts by weight may be in a too small quantity to obtain a satisfactory effect. Its addition in an amount more than 100 parts by weight may make workability poor and also may result in low physical properties of the silicone rubber obtained.

A conducting agent including conductive inorganic oxides such as conductive zinc white, and a filler or thickening agent such as silicone rubber powder, iron oxide red, pulverized quartz and calcium carbonate may also be added to the composition of the present invention.

An inorganic or organic blowing agent may further be added to the composition of the present invention. Such a blowing agent may be exemplified by azobisisobutyronitrile, dinitropentamethylenetetramine, benzene sulfone hydrazide and azodicarbonamide. It may preferably be added in an amount of from 1 to 10 parts by weight based on 100 parts by weight of the component-(A) organopolysiloxane. Thus, a spongy silicone rubber can be obtained when the blowing agent is added to the composition of the present invention.

A colorant, a heat resistance improver, a reaction control agent, a release agent, a filler dispersant and so forth may also be added to the composition of the present invention. As the filler dispersant, usable are diphenylsilanediols, various alkoxysilanes, carbon functional silanes and silanol-group-containing low-molecular-weight siloxanes. It may preferably be added only in a minimum quantity so that the effect of the present invention is not damaged.

In order to impart flame retardancy and fire resistance, any known flame retarder and fire-resisting agent, such as platinum compounds, titanium dioxide, manganese carbonate, $\gamma$-$Fe_2O_3$, ferrite, mica, glass fibers, and glass flakes may still also be added to the composition of the present invention.

Production of conductive organopolysiloxane composition and its use:

The conductive organopolysiloxane composition of the present invention can be obtained by mixing the components (A) and (B) and optionally other components uniformly by means of a rubber material kneading machine such as a Banbury mixer or a dough mixer (kneader), optionally further followed by heating.

The conductive organopolysiloxane composition thus obtained may be molded and cured by various molding processes such as press molding and extrusion in the presence of a curing agent, in accordance with the intended purpose. Curing conditions may be selected appropriately in accordance with curing processes and molded-product thickness. Usually, curing may be carried out at room temperature to 400° C. for 10 seconds to 30 days. The curing may be divided into primary curing and secondary curing.

The molded cured product thus obtained may be used in zebra connector's conducting portions, electrical switches and so forth.

EXAMPLES

The present invention will be described below in greater detail by giving Example and Comparative Example. The present invention is by no means limited to the following Example.

Example 1

Comparative Example 1

Commercially available silver-coated glass beads (silver weight: 12 parts by weight based on 100 parts by weight of glass beads; trade name: BALOON S-3000S3; available from Toshiba Baroteni Co., Ltd.) were treated in the following way.

The above S-3000S3 was immersed in 1 liter of a 0.3% ethanol solution of $C_{36}H_{26}N_5OCl$, followed by filtration and air drying to obtain surface-treated conductive glass beads ($C_{36}H_{26}N_5OCl$ weight: 250 ppm based on silver-coated glass beads). This is herein called sample A.

For comparison, 300 g of S-3000S3 was immersed in 1 liter of ethanol, followed by filtration and air drying to obtain untreated conductive glass beads. This is herein called sample B.

Next, 100 parts by weight of an organopolysiloxane having an average molecular weight of 8,000, terminated with dimethylvinylsilyl groups at both ends and comprised of 99.85 mol % of a dimethylsiloxane [$(CH_3)_2SiO_{2/2}$] unit and 0.15 mol % of a methylvinylsiloxane [$(CH_2=CH)CH_3SiO_{2/2}$] unit, 40 parts by weight of fine silica powder (trade name: AEROSIL 200LP; available from Nippon Aerosil Co., Ltd.), 500 parts by weight of the sample A or B, and 0.5 part by weight of an 80% by weight 2,5-dimethylbis(2,5-t-butylperoxy)hexane paste (trade name: C-8A; available from Shin-Etsu Chemical Co., Ltd.) were mixed, and the mixture obtained was extruded into a sheet, and then subjected to primary curing at 170° C. for 10 minutes and secondary curing at 150° C. for 1 hour. Thus, sheets with a thickness of 2 mm (Example 1 and Comparative Example 1) were obtained.

Next, the initial volume resistivity of these sheets was measured, and thereafter the sheets were left in a dryer kept at 200° C. to measure their volume resistivity with time.

Results obtained are shown in Table 1. In the table, "parts" refers to "part(s) by weight" in all occurrences.

TABLE 1

|  | Example 1 | Comparative Example 1 |
| --- | --- | --- |
| Organopolysiloxane (parts) | 100 | 100 |
| Sample A (parts) | 500 |  |
| Sample B (parts) |  | 500 |
| Initial volume resistivity ($\Omega \cdot cm$) | $2.0 \times 10^{-3}$ | $350 \times 10^{-2}$ |
| 200° C./4 hours | $2.0 \times 10^{-3}$ | $2.2 \times 10^{-1}$ |
| 200° C./24 hours | $3.5 \times 10^{-3}$ | $2.6 \times 10^{3}$ |
| 200° C./72 hours | $5.5 \times 10^{-3}$ | $2.0 \times 10^{4}$ |

As can be seen from the above table, the sheet of Example 1 has a electrical conductivity superior to that of the sheet of Comparative Example 1, and also little undergoes a change with time in a high-temperature environment of 200° C. On the other hand, the electrical conductivity of the sheet of Comparative Example 1 has changed (deteriorated) greatly with time.

As described above, according to the present invention, the use of the conductive material obtained by subjecting the conductive metal, the conductive metal compound, the filler surface-treated with the conductive metal and/or the filler surface-treated with the conductive metal compound, to surface treatment with the compound represented by the general formula (1) and/or the compound represented by the general formula (2) enables formation of a silicone rubber having an improved electrical conductivity and also stably retainable of electrical conductivity almost without undergoing a change in electrical conductivity even in a high-temperature environment.

What is claimed is:

1. A conductive organopolysiloxane composition comprising:

(A) 100 parts by weight of an organopolysiloxane; and
    (B) 0.1 to 800 parts by weight of a conductive material obtained by subjecting a member selected from the group consisting of a conductive metal, a conductive metal compound, a filler surface-treated with a conductive metal and a filler surface-treated with a conductive metal compound, to surface treatment with a compound selected from the group consisting of a compound represented by the following general formula (1) and a compound represented by the following general formula (2)

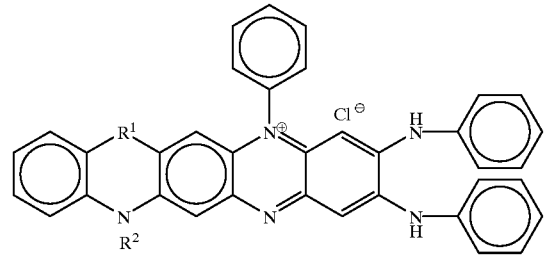

(1)

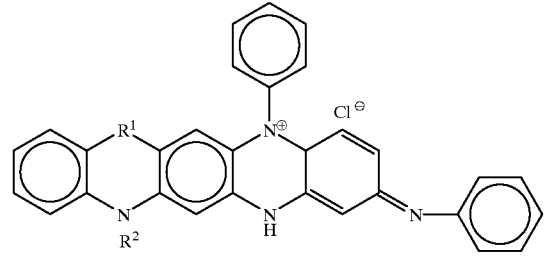

(2)

wherein $R^1$ represents —O— or —NH—, and $R^2$ represents a hydrogen atom or a phenyl group.

2. The composition according to claim 1, wherein said conductive material is a conductive metal powder.

3. The composition according to claim 1, wherein said conductive metal compound is selected from the group consisting of tin oxide, zinc oxide, conductive titanium oxide and conductive barium sulfate.

4. The composition according to claim 1, wherein said filler to be surface-treated is glass beads, talc, graphite or carbon black.

5. The composition according to claim 1, wherein the component-(B) is a conductive material obtained by subjecting glass beads surface-treated with a member selected from the group consisting of a conductive metal and a conductive metal compound, to surface treatment with the compound selected from the group consisting of a compound represented by the above general formula (1) and a compound represented by the above general formula (2).

6. The composition according to claim 1, wherein the compound of the general formula (1) or (2) has the formula:

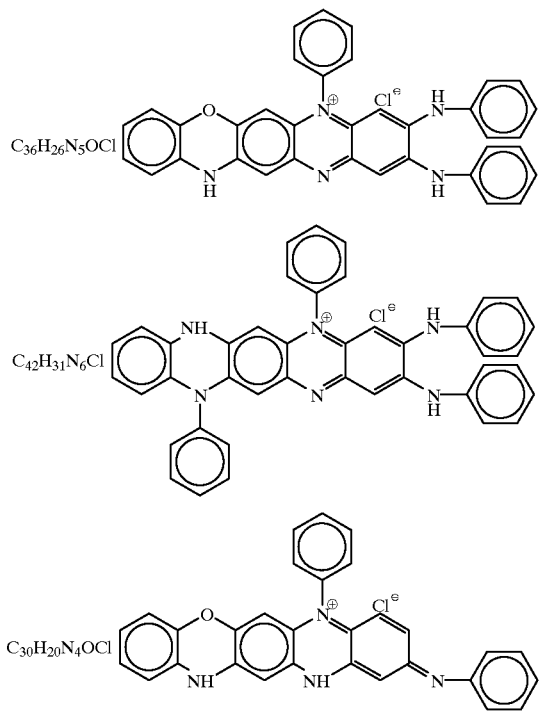

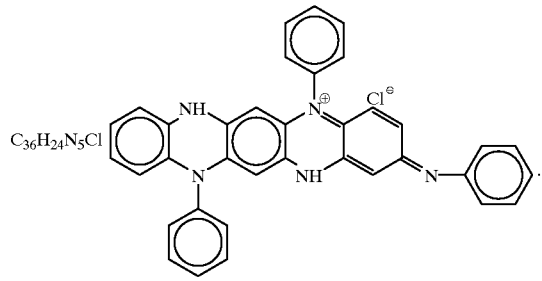

7. The composition according to claim 1, wherein the organopolysiloxane of the component (A) has at least two alkenyl groups, and said composition further comprises an organohydrogenpolysiloxane and a platinum catalyst, whereby said composition is addition-curable.

8. The composition according to claim 1, further comprises an organic peroxide, whereby said composition is peroxide-curable.

9. The composition according to claim 1, further comprising a fine silica powder.

* * * * *